(12) United States Patent
Kashiwakura et al.

(10) Patent No.: US 12,498,227 B2
(45) Date of Patent: Dec. 16, 2025

(54) INFORMATION PROCESSING APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventors: Toshiki Kashiwakura, Ota-ku (JP); Ai Miyata, Sakai (JP); Kotaro Hirose, Nisshin (JP); Sho Minagawa, Nisshin (JP); Yuki Uchida, Iwakura (JP); Tsuyoshi Okada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 18/364,038

(22) Filed: Aug. 2, 2023

(65) Prior Publication Data
US 2024/0053152 A1 Feb. 15, 2024

(30) Foreign Application Priority Data

Aug. 9, 2022 (JP) .................................. 2022-127466

(51) Int. Cl.
*G01C 21/20* (2006.01)
*G01C 21/34* (2006.01)
*G06T 7/70* (2017.01)
*G06V 20/58* (2022.01)

(52) U.S. Cl.
CPC .............. *G01C 21/206* (2013.01); *G06T 7/70* (2017.01); *G06V 20/58* (2022.01); *G01C 21/3461* (2013.01); *G06T 2207/30232* (2013.01); *G06T 2207/30252* (2013.01)

(58) Field of Classification Search
CPC .............. G01C 21/206; G01C 21/3461; G01C 21/3602; G01C 21/3415; G06T 7/70; G06T 2207/30232; G06T 2207/30252; G06V 20/58; G08G 1/096816; G08G 1/04; G08G 1/048; G08G 1/096805; H04N 7/18
See application file for complete search history.

(56) References Cited

U.S. PATENT DOCUMENTS 10,048,700 B1 * 8/2018 Curlander ............ G08G 1/0116
10,796,582 B1 * 10/2020 Rodriguez Bravo . H04W 4/022

FOREIGN PATENT DOCUMENTS

| JP | S58-181588 A | 10/1983 |
| JP | 2011-221959 A | 11/2011 |
| JP | 2018-197731 A | 12/2018 |
| JP | 2021-033708 A | 3/2021 |

* cited by examiner

*Primary Examiner* — Anne Marie Antonucci
*Assistant Examiner* — Wesam Almadhrhi
(74) *Attorney, Agent, or Firm* — Oliff PLC

(57) ABSTRACT

An information processing apparatus configured to determine a travel route for a vehicle traveling in a facility, the information processing apparatus includes a controller configured to determine the travel route for the vehicle based on operation information on disaster prevention equipment installed in the facility and/or first image information including an image of a passageway in the facility, the image being captured by an imaging apparatus installed in the facility, and vehicle position information indicating a position of the vehicle, and a communication interface configured to transmit, to the vehicle, travel route information indicating the travel route.

20 Claims, 4 Drawing Sheets

INFORMATION PROCESSING APPARATUS, METHOD, AND NON-TRANSITORY COMPUTER READABLE MEDIUM

CROSS-REFERENCE TO RELATED APPLICATION

This application claims priority to Japanese Patent Application No. 2022-127466 filed on Aug. 9, 2022, the entire contents of which are incorporated herein by reference.

TECHNICAL FIELD

The present disclosure relates to an information processing apparatus, a method, and a non-transitory computer readable medium.

BACKGROUND

Technology for travel of vehicles at times of disaster is known. For example, Patent Literature (PTL) 1 discloses technology related to an apparatus that, in a disaster mode, controls shared vehicles to display travel routes derived based on road information available at times of disaster.

CITATION LIST

Patent Literature

PTL 1: JP 2021-033708 A

SUMMARY

There is room for improvement with respect to technology for travel of vehicles at times of disaster.

It would be helpful to improve technology for travel of vehicles at times of disaster.

An information processing apparatus according to an embodiment of the present disclosure is an information processing apparatus configured to determine a travel route for a vehicle traveling in a facility, the information processing apparatus including:
- a controller configured to determine the travel route for the vehicle based on operation information on disaster prevention equipment installed in the facility and/or first image information including an image of a passageway in the facility, the image being captured by an imaging apparatus installed in the facility, and vehicle position information indicating a position of the vehicle; and
- a communication interface configured to transmit, to the vehicle, travel route information indicating the travel route.

A method according to an embodiment of the present disclosure is a method performed by an information processing apparatus configured to determine a travel route for a vehicle traveling in a facility, the method including:
- determining the travel route for the vehicle based on operation information on disaster prevention equipment installed in the facility and/or first image information including an image of a passageway in the facility, the image being captured by an imaging apparatus installed in the facility, and vehicle position information indicating a position of the vehicle; and
- transmitting, to the vehicle, travel route information indicating the travel route.

A non-transitory computer readable medium according to an embodiment of the present disclosure stores a program configured to cause an information processing apparatus to execute operations, the information processing apparatus being configured to determine a travel route for a vehicle traveling in a facility, the operations including:
- determining the travel route for the vehicle based on operation information on disaster prevention equipment installed in the facility and/or first image information including an image of a passageway in the facility, the image being captured by an imaging apparatus installed in the facility, and vehicle position information indicating a position of the vehicle; and
- transmitting, to the vehicle, travel route information indicating the travel route.

According to an embodiment of the present disclosure, technology for travel of vehicles at times of disaster is improved.

DETAILED DESCRIPTION

Hereinafter, an embodiment of the present disclosure will be described.

Outline of Embodiment

Figure 1:
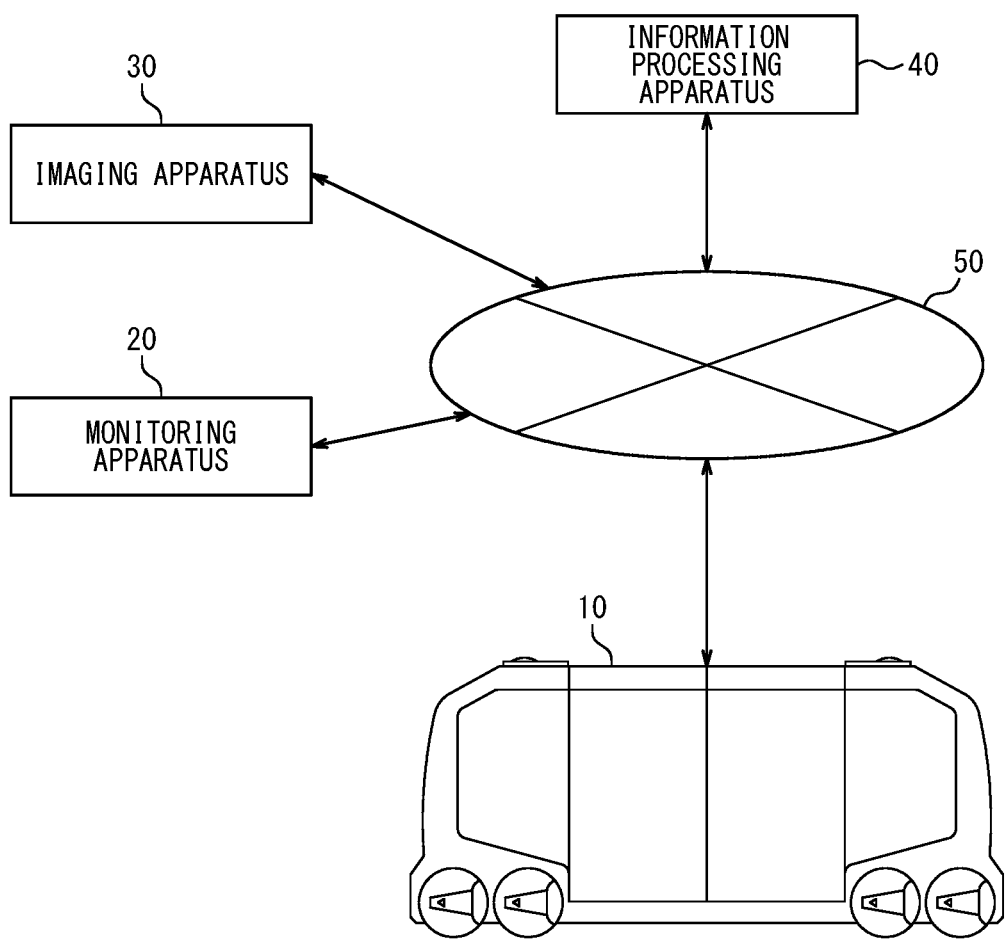
FIG. 1 is a block diagram illustrating a schematic configuration of a system according to an embodiment of the present disclosure.

FIG. 1 is a block diagram illustrating a schematic configuration of a system 1 according to an embodiment of the present disclosure. The system 1 includes a vehicle 10, a monitoring apparatus 20, an imaging apparatus 30, and an information processing apparatus 40. The vehicle 10, the monitoring apparatus 20, the imaging apparatus 30, and the information processing apparatus 40 are communicably connected to a network 50 including, for example, the Internet, a mobile communication network, and the like.

For simplicity of explanation, FIG. 1 illustrates one each of the vehicle 10, monitoring apparatus 20, imaging apparatus 30, and information processing apparatus 40 provided in the system 1, but the number of the components is not limited to this. The system 1 may include two or more information processing apparatuses 40. The system 1 may also include two or more monitoring apparatuses 20. The system 1 may also include two or more imaging apparatuses 30. The number of vehicles 10 provided in the system 1 may be two or more, and may be freely determined.

The vehicle 10 is an automobile, for example, but is not limited to this, and may be any appropriate vehicle. The automobile is, for example, a gasoline automobile, a battery electric vehicle (BEV), a hybrid electric vehicle (HEV), a plug-in hybrid electric vehicle (PHEV), a fuel cell electric vehicle (FCEV), or the like, but is not limited to these. In the present embodiment, the vehicle 10 is assumed to be any autonomous vehicle that travels unmanned, but may also be a manned vehicle.

In the present embodiment, the vehicle 10 travels with users (customers or general users) on board in a facility such as a factory. The term "in a facility" is not limited to indoors, but may also include outdoors.

The information processing apparatus 40 is, for example, a computer such as a server apparatus. The information processing apparatus 40 is, for example, a server that belongs to a cloud computing system or other computing systems. The information processing apparatus 40 is not limited to this, and may be any general purpose electronic device such as a personal computer (PC), or may be any other electronic device that is dedicated to the system 1. The information processing apparatus 40 can communicate with each of the vehicle 10, the monitoring apparatus 20, and the imaging apparatus 30 via the network 50. In the present embodiment, the information processing apparatus 40 manages tours of the facility using the vehicle 10 in the system 1.

First, an outline of the present embodiment will be described, and details thereof will be described later. The information processing apparatus determines a travel route for the vehicle 10 based on operation information indicating whether disaster prevention equipment installed in the facility is in operation and/or image information (first image information) including an image of a passageway in the facility captured by the imaging apparatus 30 installed in the facility, and vehicle position information indicating a position of the vehicle 10 traveling in the facility. The information processing apparatus 40 also transmits, to the vehicle 10, travel route information indicating the travel route. The vehicle 10 can travel in the facility according to the travel route indicated by the travel route information.

As described above, according to the present embodiment, a travel route for the vehicle 10 is determined based on operation information and/or first image information. For example, the travel route is determined so as not to include an area around disaster prevention equipment that is in operation. For example, the travel route is determined so as not to include a passageway that is indicated in a first image as being damaged. Therefore, the present embodiment increases the probability that a travel route along which the vehicle 10 can travel safely can be determined. This increases the probability that the vehicle 10 can travel safely. Thus, technology for travel of the vehicle at times of disaster is improved in terms of increased safety in the travel of the vehicle 10.

Next, configurations of the system 1 will be described in detail.

Configuration of Vehicle

Figure 2:
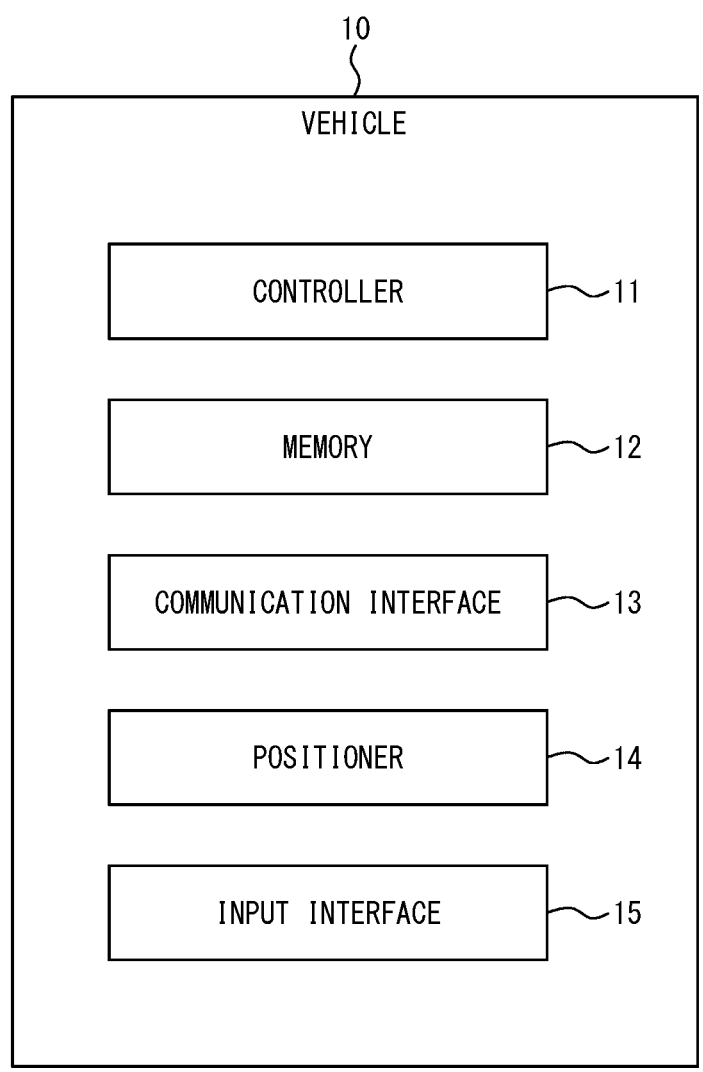
FIG. 2 is a block diagram illustrating a schematic configuration of a vehicle.

As illustrated in FIG. 2, the vehicle 10 includes a controller 11, a memory 12, a communication interface 13, a positioner 14, and an input interface 15.

The controller 11 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 11 executes processes related to operations of the vehicle 10 while controlling components of the vehicle 10.

The memory 12 includes one or more memories. The memories are semiconductor memories, magnetic memories, optical memories, or the like, for example, but are not limited to these. The semiconductor memory is, for example, Random Access Memory (RAM) or Read Only Memory (ROM). The RAM is, for example, static random access memory (SRAM) or dynamic random access memory (DRAM). The ROM is, for example, electrically erasable programmable read only memory (EEPROM). The memories included in the memory 12 may each function as, for example, a main memory, an auxiliary memory, or a cache memory. The memory 12 stores any information to be used for the operations of the vehicle 10. For example, the memory 12 may store a system program, an application program, embedded software, and the like. The information stored in the memory 12 may be updated with, for example, information acquired from the network 50 via the communication interface 13. In the present embodiment, the memory 12 can store information to be used for the operations of the vehicle 10.

The communication interface 13 includes at least one interface for external communication for connecting to the network 50. The interface for communication is, for example, an interface compliant with a mobile communication standard such as a Long Term Evolution (LTE), the 4th generation (4G) standard, or the 5th generation (5G) standard, or an interface compliant with a short-range wireless communication standard such as Bluetooth® (Bluetooth is a registered trademark in Japan, other countries, or both), but is not limited to these. The communication interface 13 receives information to be used for the operations of the vehicle 10.

The positioner 14 includes one or more apparatuses that acquires vehicle position information indicating the position of the vehicle 10. Specifically, the positioner 14 includes a receiver corresponding to the Global Positioning System (GPS), for example, but is not limited to this, and may include a receiver corresponding to any positioning system. The positioner 14 may acquire the vehicle position information continually, periodically, or non-periodically.

The input interface 15 includes an information input means into the vehicle 10. For example, the input interface 15 includes any imaging module capable of imaging the surroundings of the vehicle 10. The imaging module includes one or more cameras each of which is installed at an appropriate location on the vehicle 10 to enable imaging of the surroundings of the vehicle 10. In the present embodiment, the input interface 15 can image a passageway along which the vehicle 10 travels.

Configuration of Monitoring Apparatus

Figure 3:
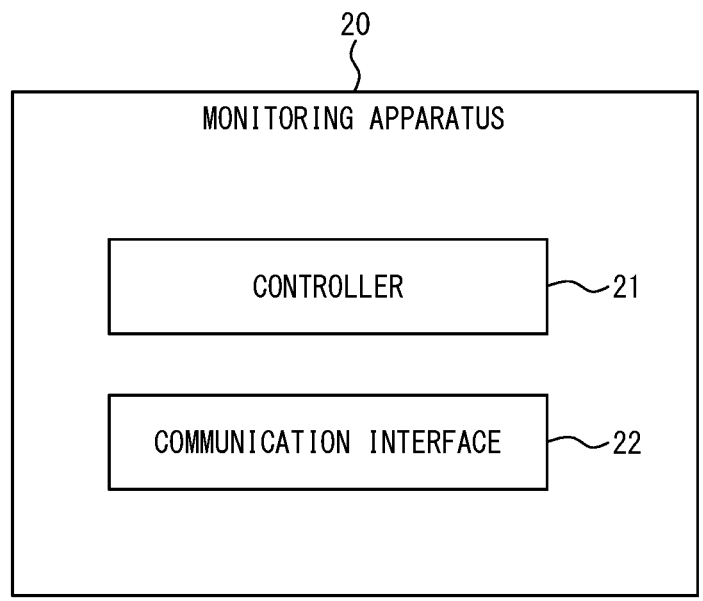
FIG. 3 is a block diagram illustrating a schematic configuration of a monitoring apparatus.

As illustrated in FIG. 3, the monitoring apparatus 20 includes a controller 21 and a communication interface 22.

The controller 21 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 21 monitors disaster prevention equipment installed in the facility and executes the process of generating information regarding operation of the disaster prevention equipment.

The disaster prevention equipment is equipment that operates to prevent disaster and includes fire prevention equipment, fire extinguishing equipment, disaster detectors, or the like. The fire prevention equipment includes fire shutters, fire doors, fire dampers, or the like. The fire extinguishing equipment includes fire extinguishers, indoor hydrant systems, outdoor hydrant systems, sprinkler systems, or the like. The disaster detectors include fire detectors, gas leak detectors, or the like.

The communication interface 22 includes at least one interface for external communication for connecting to the network 50. The interface for communication may be either a wired or wireless communication interface. For wired communication, the interface for communication is, for example, a Local Area Network (LAN) interface or Universal Serial Bus (USB). For wireless communication, the interface for communication is, for example, an interface compliant with a mobile communication standard such as LTE, the 4G standard, or the 5G standard, or an interface compliant with a short-range wireless communication standard such as Bluetooth®. The communication interface 22 transmits data obtained by operations of the monitoring apparatus to the outside. The communication interface 22 may also communicate with each unit of the disaster prevention equipment to acquire information regarding an operation status of each unit of the disaster prevention equipment. In the present embodiment, the communication interface 22 communicates with the information processing apparatus 40 via the network 50.

Configuration of Imaging Apparatus

The imaging apparatus 30 is any imaging module that is installed in the facility and can image passageways in the facility. The imaging module includes one or more cameras, which may include monocular cameras, stereo cameras, omnidirectional cameras, or the like. The imaging apparatus 30 may be installed so as to enable imaging all passageways in the facility, or only some of the passageways in the facility. The imaging apparatus 30 may be installed so as to enable imaging of the disaster prevention equipment. The imaging apparatus 30 also has a communication function and transmits data obtained by operations of the imaging apparatus 30 to the outside. In the present embodiment, the imaging apparatus 30 communicates with the information processing apparatus 40 via the network 50. The imaging apparatus 30 may communicate with the monitoring apparatus 20 via the network 50.

Configuration of Information Processing Apparatus

Figure 4:
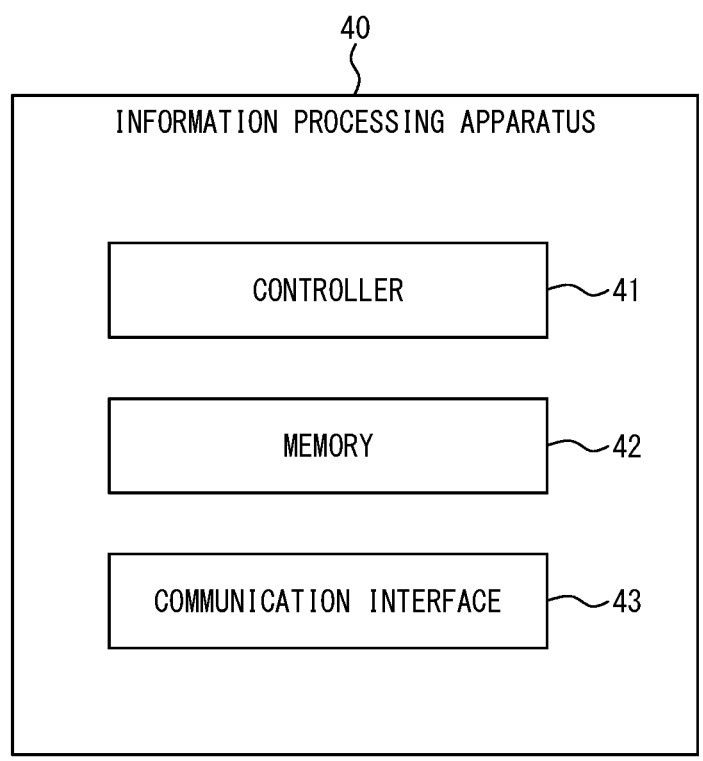
FIG. 4 is a block diagram illustrating a schematic configuration of an information processing apparatus.

As illustrated in FIG. 4, the information processing apparatus 40 includes a controller 41, a memory 42, and a communication interface 43.

The controller 41 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 41 executes processes related to operations of the information processing apparatus 40 while controlling each part of the information processing apparatus 40.

The memory 42 includes one or more memories. The memories are semiconductor memories, magnetic memories, optical memories, or the like, for example, but are not limited to these. The semiconductor memory is, for example, RAM or ROM. The RAM is, for example, SRAM or DRAM. The ROM is, for example, EEPROM. The memories included in the memory 42 each function as, for example, a main memory, an auxiliary memory, or a cache memory. The memory 42 stores information to be used for the operations of the information processing apparatus 40. For example, the memory 42 may store a system program, an application program, a database, and the like. The information stored in the memory 42 may be updated with, for example, information acquired from the network 50 via the communication interface 43. In the present embodiment, the memory 42 can store information necessary for determining a travel route for the vehicle 10.

The communication interface 43 includes at least one interface for external communication for connecting to the network 50. The interface for communication may be either a wired or wireless communication interface. For wired communication, the interface for communication is, for example, a LAN interface or USB. For wireless communication, the interface for communication is, for example, an interface compliant with a mobile communication standard such as LTE, the 4G standard, or the 5G standard, or an interface compliant with a short-range wireless communication standard such as Bluetooth®. The communication interface 43 receives data to be used for the operations of the information processing apparatus 40, and transmits data obtained by the operations of the information processing apparatus 40 to the outside. In the present embodiment, the communication interface 43 communicates with each of the vehicle 10, the monitoring apparatus 20, and the imaging apparatus 30 via the network 50.

The information processing apparatus 40 may further include an input interface and an output interface, though no input and output interfaces are illustrated in FIG. 4 of the present embodiment. In other words, in addition to receiving (input) and transmitting (output) information via the communication interface 43, information may be input and output via the input and output interfaces included in the information processing apparatus 40.

The functions of the information processing apparatus 40 may be implemented by executing a program relating to an information processing method according to the present embodiment by a processor corresponding to the controller 41. That is, the functions of the information processing apparatus 40 are realized by software. The program causes a computer to execute the operations of the information processing apparatus 40, thereby causing the computer to function as the information processing apparatus 40. That is, the computer executes the operations of the information processing apparatus 40 in accordance with the program to thereby function as the information processing apparatus 40.

In the present embodiment, the program can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a digital versatile disc (DVD) or a compact disc read only memory (CD-ROM) on which the program is recorded. The program may also be distributed by storing the program in a storage of an external server and transmitting the program from the external server to another computer. The program may be provided as a program product.

Flow of Operations of System

Figure 5:
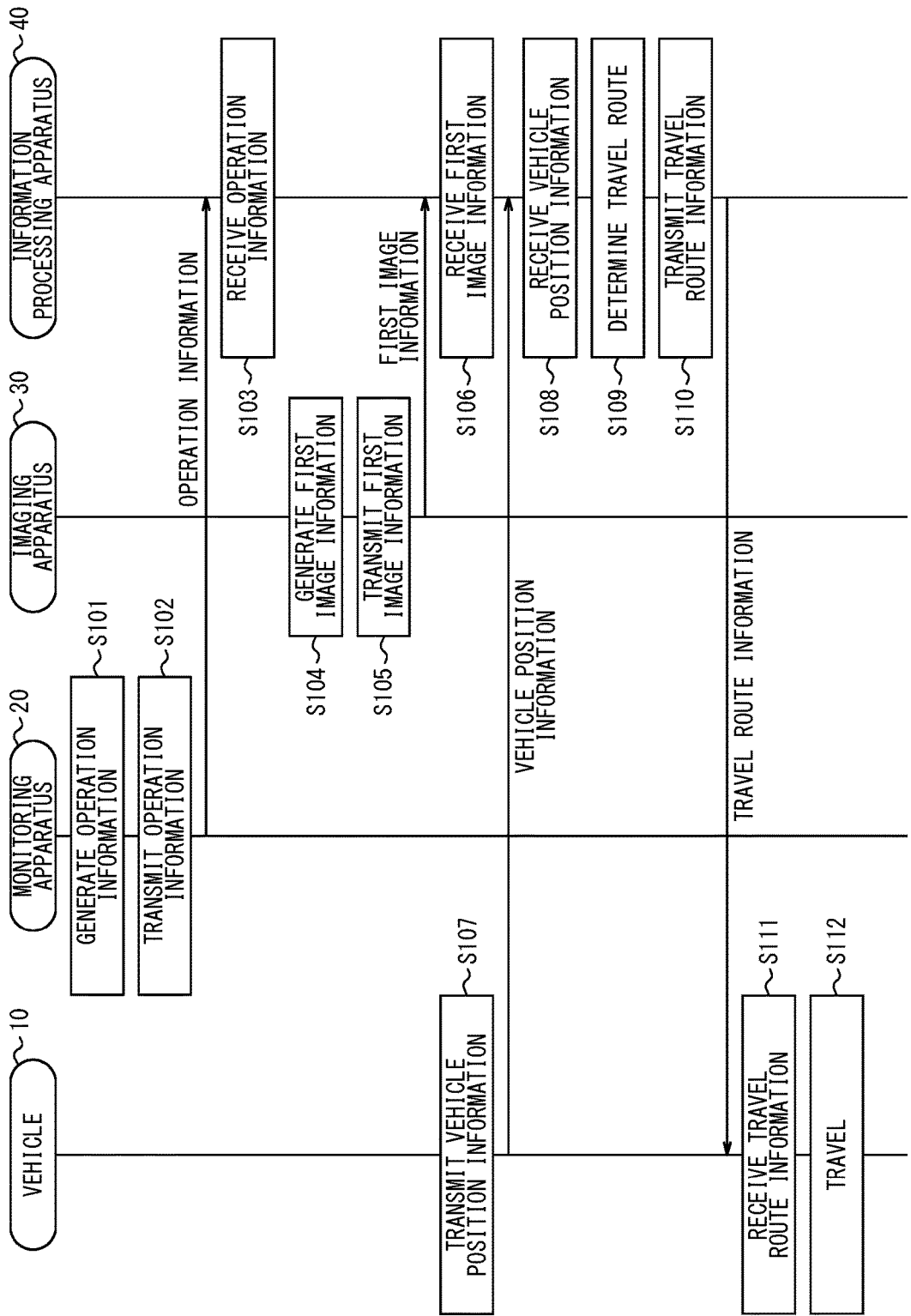
FIG. 5 is a sequence diagram illustrating the embodiment of the present disclosure.

Operations of the system 1 according to the present embodiment will be described with reference to FIG. 5. The operations of the system 1 described below include operations (steps S103, S106, S108 to S110) of the information processing apparatus 40 according to the present embodiment.

Step S101: The controller 21 of the monitoring apparatus 20 determines whether disaster prevention equipment installed in a facility is in operation, and generates operation information on the disaster prevention equipment (information indicating whether each unit of the disaster prevention equipment is in operation).

The controller 21 may determine whether the disaster prevention equipment is in operation based on electrical signals that change with operations of the disaster prevention equipment. The controller 21 may determine whether the disaster prevention equipment is in operation based on disaster prevention equipment image information including images of the disaster prevention equipment. In the configuration in which the controller 21 determines whether the disaster prevention equipment is in operation based on the disaster prevention equipment image information, the monitoring apparatus 20 may have an imager with an imaging function, or the monitoring apparatus 20 may receive the disaster prevention equipment image information from another apparatus (for example, the imaging apparatus 30). The monitoring apparatus 20 may be configured integrally with the disaster prevention equipment or separately from the disaster prevention equipment.

Multiple units of the disaster prevention equipment may be installed in the facility. In such a case, the controller 21 determines whether each of the multiple units of the disaster prevention equipment is in operation and generates operation information that includes information indicating whether the disaster prevention equipment is in operation and information identifying the multiple units of the disaster prevention equipment. The controller 21 may generate the operation information constantly, periodically, or non-periodically. The controller 21 may generate the operation information upon a request from the information processing apparatus 40.

Step S102: The communication interface 22 of the monitoring apparatus 20 transmits the operation information on the disaster prevention equipment to the information processing apparatus 40.

Step S103: The communication interface 43 of the information processing apparatus 40 receives the operation information transmitted by the communication interface 22 of the monitoring apparatus 20.

Step S104: The imaging apparatus 30 captures images of passageways in the facility and generates first image information including first images (the images of the passageways).

The imaging apparatus 30 may generate the first images constantly, periodically, or non-periodically. The imaging apparatus 30 may generate the first images upon a request from the information processing apparatus 40.

Step S105: The imaging apparatus 30 transmits the first image information including the first images to the information processing apparatus 40.

Step S106: The communication interface 43 of the information processing apparatus 40 receives the first image information transmitted by the imaging apparatus 30.

Step S107: The communication interface 13 of the vehicle 10 transmits vehicle position information measured by the positioner 14.

Step S108: The communication interface 43 of the information processing apparatus 40 receives the vehicle position information, which is measured by the positioner 14 of the vehicle 10 and transmitted by the communication interface 13.

Step S109: The controller 41 of the information processing apparatus determines a travel route based on the operation information and/or the first image information, and the vehicle position information.

Specifically, the controller 41 determines, based on the operation information or the first image information, a travel route from a position indicated by the vehicle position information to a destination. The destination may be a predetermined position in the facility and may be determined for a type of disaster. For example, when the type of disaster is a fire, the destination may be an exit from the facility. When the type of disaster is an earthquake, the destination may be an exit from the facility or a designated evacuation site that is secured within the facility.

As an example, the controller 41 can determine a travel route so as not to include a passageway that is within a predetermined range from a position at which the disaster prevention equipment that is indicated in the operation information as being in operation is located. As another example, the controller 41 can determine a damaged passageway based on the first image information and determine a travel route so as not to include the damaged passageway. The controller 41 can use any image processing to determine the damaged passageway based on the first image information. Here, damage to the passageway includes damage to the ground, floor, walls, ceiling, or the like that make up the passageway. The predetermined range is a range into which intrusion is made difficult by the operations of the disaster prevention equipment, and may be determined for each unit of the disaster prevention equipment. The controller 41 may also determine a travel route based on both the operation information and the first image information.

Step S110: The controller 41 of the information processing apparatus controls the communication interface 43 to transmit, to the vehicle 10, travel route information indicating the travel route.

Step S111: The communication interface 13 of the vehicle 10 receives the travel route information transmitted from the information processing apparatus 40.

Step S112: The vehicle 10 travels along the travel route indicated by the travel route information.

In the above description of the operations of the system 1, the order of processing in steps S101 to S103, processing in steps S104 to S106, and processing in steps S107 and S108 is not limited to this. The system 1 may perform the processing in steps S101 to S103, the processing in steps S104 to S106, and the processing in steps S107 and S108 in any order. The system 1 may simultaneously perform any two or more of the processing in steps S101 to S103, the processing in steps S104 to S106, and the processing in steps S107 and S108 at the same time. The system 1 does not have to perform either of the processing in steps S101 to S103 or the processing in steps S104 to S106.

As described above, the information processing apparatus 40 according to the present embodiment determines a travel route for the vehicle based on operation information on disaster prevention equipment installed in a facility and/or first image information including images of passageways in the facility captured by the imaging apparatus 30 installed in the facility, and vehicle position information indicating the position of the vehicle 10 traveling in the facility. The information processing apparatus 40 also transmits, to the vehicle 10, travel route information indicating the travel route.

Such a configuration increases the probability that the information processing apparatus 40 can prevent danger associated with the vehicle 10 traveling through a passageway in the facility that has become difficult to travel through, and can determine the travel route for the vehicle 10 to travel safely to a destination. When a disaster occurs, information on damage to public roads is provided by various companies, organizations, or the like. In facilities such as factories, damage inside the facilities is recognized by facility managers or the like who observe the inside of the facilities. However, it takes time for the managers or the like to observe the inside of the facilities, and the chaos that accompanies the disaster may prevent the managers or the like from observing the inside of the facilities. Thus, it is difficult to reliably recognize passageways through which the vehicle 10 can travel. In contrast, the configuration described above increases the probability that a travel route along which the vehicle 10 can travel safely can be determined. This increases the probability that the vehicle 10 can travel safely. Thus, technology for travel of the vehicle 10 at times of disaster is improved in terms of increased safety in the travel of the vehicle 10.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 40 in the above embodiment are distributed to multiple computers capable of communicating with each other can be implemented. For example, an embodiment in which some or all of the components of the information processing apparatus 40 are provided in the vehicle 10 can also be implemented. An embodiment in which the configuration and operations of the monitoring apparatus 20 are distributed to multiple computers capable of communicating with each other can be implemented. For example, an embodiment in which some or all of the components of the monitoring apparatus 20 are provided in the vehicle 10 or the information processing apparatus 40 can also be implemented.

In the embodiment described above, the controller 21 of the monitoring apparatus 20 may control the communication interface 22 to transmit the operation information in advance to the information processing apparatus 40. In such a configuration, the controller 41 of the information processing apparatus 40 may calculate operation frequency based on the operation information received in advance and determine a travel route based on the operation frequency. As an example, when no operation information can be acquired from the monitoring apparatus 20 at the time of a disaster, the controller 41 can select a top predetermined number of units of the disaster prevention equipment when ranking the disaster prevention equipment in order of the operation frequency, among multiple units of the disaster prevention equipment installed in the facility, and determine a travel route so as not to include pathways within a predetermined range from positions at which the selected units of the disaster prevention equipment are installed. As another example, the controller 41 can select units of the disaster prevention equipment whose operation frequencies are higher than a predetermined frequency, and determine a travel route so as not to include passageways that are within a predetermined range from positions at which the selected units of the disaster prevention equipment are installed. The predetermined frequency can be, for example, an average of operation frequencies of the multiple units of the disaster prevention equipment installed in the facility.

The passageways around the units of the disaster prevention equipment with high operation frequencies calculated based on the operation information are passageways that are frequently difficult to travel in past disasters, and are likely to be difficult to travel in the event of a disaster in the present or future. Thus, in the event that the monitoring apparatus 20 fails and does not operate due to the disaster, for example, the information processing apparatus 40 can determine a travel route that can be expected to be relatively safe by not including the passageways that are likely to be difficult to travel, based on the operation information received in advance.

In the embodiment described above, the communication interface 43 of the information processing apparatus 40 may receive user position information indicating the positions of users who are scheduled to board the vehicle 10 in the facility. In such a configuration, the controller 41 may determine a travel route based on the operation information or the first image information, the vehicle position information, and the user position information. Specifically, the controller 41 determines a travel route so as to include a passageway facing an area that includes the positions of the users, as indicated by the user position information. Thus, in the event that a disaster occurs while no users are on board the vehicle 10, the information processing apparatus 40 can determine a travel route along which the vehicle 10 does not travel through a passageway that is hazardous due to the disaster and users who are scheduled to board can get on the vehicle 10. This increases the probability that the vehicle 10 can safely transport the users. For example, when a disaster occurs while the users are on board the vehicle 10, the information processing apparatus 40 may determine a travel route without being based on the user position information.

The information processing apparatus 40 can acquire the user position information by any method. For example, the information processing apparatus 40 may receive the user position information from portable information terminals with GPS receivers in the users' possession, or from an authentication system used when the users enter each area of the facility.

In the embodiment described above, the communication interface 13 of the vehicle 10 may transmit, to the information processing apparatus 40, surrounding information acquired by the input interface 15 when the vehicle 10 travels along a travel route. For example, the surrounding information is image information (second image information) including images around the vehicle 10 captured by an imaging module included in the input interface 15 of the vehicle 10. In such a configuration, the communication interface 43 of the information processing apparatus 40 may receive the second image information transmitted from the vehicle 10, and the controller 41 may change the travel route based on the second image information.

Specifically, the controller 41 of the information processing apparatus 40 can determine a damaged passageway based on the second image information and change the travel route so as not to include the damaged passageway. More specifically, the controller 41 can change a portion from the position of the vehicle 10 to a destination, among the travel route indicated by the travel route information, so as not to include the damaged passageway. For example, as described above, in a configuration in which the imaging apparatus 30 is installed so as to enable imaging only some, but not all, passageways in the facility, damage may occur in a passageway that is not imaged by the imaging apparatus 30 and is included in a travel route determined by the information processing apparatus 40 based on the first image information. Even in this case, the vehicle 10 can still determine damage to the passageway based on the second image information generated by the imaging module included in the input interface 15, and change the travel route so as not to include the damaged passageway. Accordingly, the vehicle 10 can travel along the changed travel route, thus increasing the probability of safe travel.

For example, an embodiment in which a general purpose computer functions as the information processing apparatus 40 according to the above embodiment can also be implemented. Specifically, a program in which processes for realizing the functions of the information processing apparatus 40 according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] An information processing apparatus configured to determine a travel route for a vehicle traveling in a facility, the information processing apparatus comprising:
  a controller configured to determine the travel route for the vehicle based on operation information on disaster prevention equipment installed in the facility and/or first image information including an image of a passageway in the facility, the image being captured by an imaging apparatus installed in the facility, and vehicle position information indicating a position of the vehicle; and
  a communication interface configured to transmit, to the vehicle, travel route information indicating the travel route.

[Appendix 2] The information processing apparatus according to appendix 1, wherein the controller is configured to determine the travel route so as not to include a passageway within a predetermined range from a position at which the disaster prevention equipment that is indicated in the operation information as being in operation is installed.

[Appendix 3] The information processing apparatus according to appendix 1 or 2, wherein the controller is configured to determine the travel route based on an operation frequency calculated based on the operation information acquired in advance.

[Appendix 4] The information processing apparatus according to any one of appendices 1 to 3, wherein the controller is configured to:
  determine a damaged passageway based on the first image information; and
  determine the travel route so as not to include the damaged passageway.

[Appendix 5] The information processing apparatus according to any one of appendices 1 to 4, wherein the controller is configured to further determine the travel route based on user position information indicating a position of a user in the facility, the user being scheduled to board the vehicle.

[Appendix 6] The information processing apparatus according to any one of appendices 1 to 5, wherein the controller is configured to further change the travel route based on second image information including an image around the vehicle, the image being captured by an imaging module of the vehicle traveling along the travel route.

[Appendix 7] The information processing apparatus according to appendix 6, wherein the controller is configured to:
  determine a damaged passageway based on the second image information; and
  change the travel route so as not to include the damaged passageway.

[Appendix 8] A method performed by an information processing apparatus configured to determine a travel route for a vehicle traveling in a facility, the method comprising:
  determining the travel route for the vehicle based on operation information on disaster prevention equipment installed in the facility and/or first image information including an image of a passageway in the facility, the image being captured by an imaging apparatus installed in the facility, and vehicle position information indicating a position of the vehicle; and
  transmitting, to the vehicle, travel route information indicating the travel route.

[Appendix 9] The method according to appendix 8, wherein the determining of the travel route includes determining the travel route so as not to include a passageway within a predetermined range from a position at which the disaster prevention equipment that is indicated in the operation information as being in operation is installed.

[Appendix 10] The method according to appendix 8 or 9, wherein the determining of the travel route includes determining the travel route based on an operation frequency calculated based on the operation information acquired in advance.

[Appendix 11] The method according to any one of appendices 8 to 10, wherein the determining of the travel route includes:
  determining a damaged passageway based on the first image information; and
  determining the travel route so as not to include the damaged passageway.

[Appendix 12] The method according to any one of appendices 8 to 11, wherein the determining of the travel route includes further determining the travel route based on user position information indicating a position of a user in the facility, the user being scheduled to board the vehicle.

[Appendix 13] The method according to any one of appendices 8 to 12, further comprising changing the travel route based on second image information including an image around the vehicle, the image being captured by an imaging module of the vehicle traveling along the travel route.

[Appendix 14] The method according to appendix 13, wherein the changing of the travel route includes:
  determining a damaged passageway based on the second image information; and
  changing the travel route so as not to include the damaged passageway.

[Appendix 15] A non-transitory computer readable medium storing a program configured to cause an information processing apparatus to execute operations, the information processing apparatus being configured to determine a travel route for a vehicle traveling in a facility, the operations comprising:
  determining the travel route for the vehicle based on operation information on disaster prevention equipment installed in the facility and/or first image information including an image of a passageway in the facility, the image being captured by an imaging apparatus installed in the facility, and vehicle position information indicating a position of the vehicle; and transmitting, to the vehicle, travel route information indicating the travel route.

[Appendix 16] The non-transitory computer readable medium according to appendix 15, wherein the operations comprise determining the travel route so as not to include a passageway within a predetermined range from a position at which the disaster prevention equipment that is indicated in the operation information as being in operation is installed.

[Appendix 17] The non-transitory computer readable medium according to appendix 15 or 16, wherein the operations comprise determining the travel route based on an operation frequency calculated based on the operation information acquired in advance.

[Appendix 18] The non-transitory computer readable medium according to any one of appendices 15 to 17, wherein the operations comprise:

determining a damaged passageway based on the first image information; and determining the travel route so as not to include the damaged passageway.

[Appendix 19] The non-transitory computer readable medium according to any one of appendices 15 to 18, wherein the operations comprise further determining the travel route based on user position information indicating a position of a user in the facility, the user being scheduled to board the vehicle.

[Appendix 20] The non-transitory computer readable medium according to any one of appendices 15 to 19, wherein the operations comprise changing the travel route based on second image information including an image around the vehicle, the image being captured by an imaging module of the vehicle traveling along the travel route.

The invention claimed is:

1. An information processing apparatus configured to determine a travel route for an autonomous vehicle traveling in a facility, the information processing apparatus comprising:

a communication interface configured to receive, via wired or wireless communication, operation information on disaster prevention equipment installed in the facility, the operation information being determined based on electrical signals that change with operations of the disaster prevention equipment or disaster prevention equipment image information including images of the disaster prevention equipment; and a controller configured to determine the travel route for the autonomous vehicle based on the operation information on the disaster prevention equipment installed in the facility, and vehicle position information indicating a position of the vehicle, wherein the communication interface is further configured to transmit, via wired or wireless communication, to the autonomous vehicle, travel route information indicating the travel route, and wherein the controller determines the travel route for the autonomous vehicle based on operation frequency calculated based on the operation information acquired in advance when no operation information can be acquired.

2. The information processing apparatus according to claim 1, wherein the controller is configured to determine the travel route so as not to include a passageway within a predetermined range from a position at which the disaster prevention equipment that is indicated in the operation information as being in operation is installed.

3. The information processing apparatus according to claim 1, wherein the controller is configured to determine the travel route based on first image information including an image of a passageway in the facility, the image being captured by an imaging apparatus installed in the facility.

4. The information processing apparatus according to claim 3, wherein the controller is configured to:

determine a damaged passageway based on the first image information; and determine the travel route so as not to include the damaged passageway.

5. The information processing apparatus according to claim 1, wherein the controller is configured to further determine the travel route based on user position information indicating a position of a user in the facility, the user being scheduled to board the autonomous vehicle.

6. The information processing apparatus according to claim 1, wherein the controller is configured to further change the travel route based on second image information including an image around the autonomous vehicle, the image being captured by an imaging module of the autonomous vehicle traveling along the travel route.

7. The information processing apparatus according to claim 6, wherein the controller is configured to:

determine a damaged passageway based on the second image information; and change the travel route so as not to include the damaged passageway.

8. A method performed by an information processing apparatus configured to determine a travel route for an autonomous vehicle traveling in a facility, the method comprising:

receiving, via wired or wireless communication, operation information on disaster prevention equipment installed in the facility, the operation information being determined based on electrical signals that change with operations of the disaster prevention equipment or disaster prevention equipment image information including images of the disaster prevention equipment;

determining the travel route for the autonomous vehicle based on the operation information on the disaster prevention equipment installed in the facility, and vehicle position information indicating a position of the autonomous vehicle; and transmitting, via wired or wireless communication, to the autonomous vehicle, travel route information indicating the travel route, wherein the travel route for the autonomous vehicle is determined based on operation frequency calculated based on the operation information acquired in advance when no operation information can be acquired.

9. The method according to claim 8, wherein the determining of the travel route includes determining the travel route so as not to include a passageway within a predetermined range from a position at which the disaster prevention equipment that is indicated in the operation information as being in operation is installed.

10. The method according to claim 8, wherein the determining of the travel route includes determining the travel route based on first image information including an image of a passageway in the facility, the image being captured by an imaging apparatus installed in the facility an operation frequency calculated based on the operation information acquired in advance.

11. The method according to claim 10, wherein the determining of the travel route includes:

determining a damaged passageway based on the first image information; and determining the travel route so as not to include the damaged passageway.

12. The method according to claim 8, wherein the determining of the travel route includes further determining the travel route based on user position information indicating a position of a user in the facility, the user being scheduled to board the autonomous vehicle.

13. The method according to claim 8, further comprising changing the travel route based on second image information including an image around the autonomous vehicle, the image being captured by an imaging module of the autonomous vehicle traveling along the travel route.

14. The method according to claim 13, wherein the changing of the travel route includes:

determining a damaged passageway based on the second image information; and changing the travel route so as not to include the damaged passageway.

15. A non-transitory computer readable medium storing a program configured to cause an information processing apparatus to execute operations, the information processing apparatus being configured to determine a travel route for an autonomous vehicle traveling in a facility, the operations comprising:

receiving, via wired or wireless communication, operation information on disaster prevention equipment installed in the facility, the operation information being determined based on electrical signals that change with operations of the disaster prevention equipment or disaster prevention equipment image information including images of the disaster prevention equipment;

determining the travel route for the autonomous vehicle based on the operation information on the disaster prevention equipment installed in the facility, and vehicle position information indicating a position of the autonomous vehicle; and transmitting, via wired or wireless communication, to the autonomous vehicle, travel route information indicating the travel route, wherein the travel route for the autonomous vehicle is determined based on operation frequency calculated based on the operation information acquired in advance when no operation information can be acquired.

16. The non-transitory computer readable medium according to claim 15, wherein the operations comprise determining the travel route so as not to include a passageway within a predetermined range from a position at which the disaster prevention equipment that is indicated in the operation information as being in operation is installed.

17. The non-transitory computer readable medium according to claim 15, wherein the operations comprise determining the travel route based on first image information including an image of a passageway in the facility, the image being captured by an imaging apparatus installed in the facility.

18. The non-transitory computer readable medium according to claim 17, wherein the operations comprise:

determining a damaged passageway based on the first image information; and determining the travel route so as not to include the damaged passageway.

19. The non-transitory computer readable medium according to claim 15, wherein the operations comprise further determining the travel route based on user position information indicating a position of a user in the facility, the user being scheduled to board the autonomous vehicle.

20. The non-transitory computer readable medium according to claim 15, wherein the operations comprise changing the travel route based on second image information including an image around the autonomous vehicle, the image being captured by an imaging module of the autonomous vehicle traveling along the travel route.

* * * * *